Dec. 5, 1967   A. G. SWINT ET AL   3,356,018
PRESS FOR COMPACTING BULKY MASSES
Filed Oct. 23, 1965   3 Sheets-Sheet 1
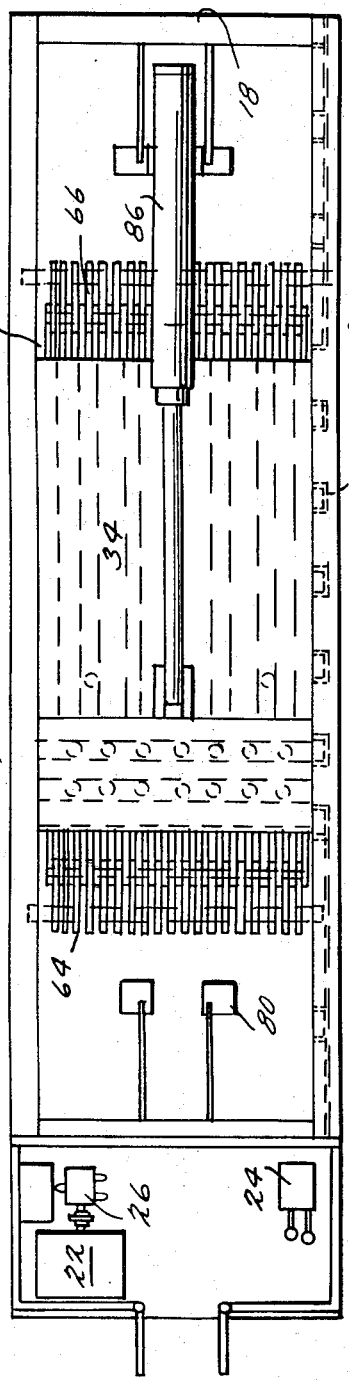
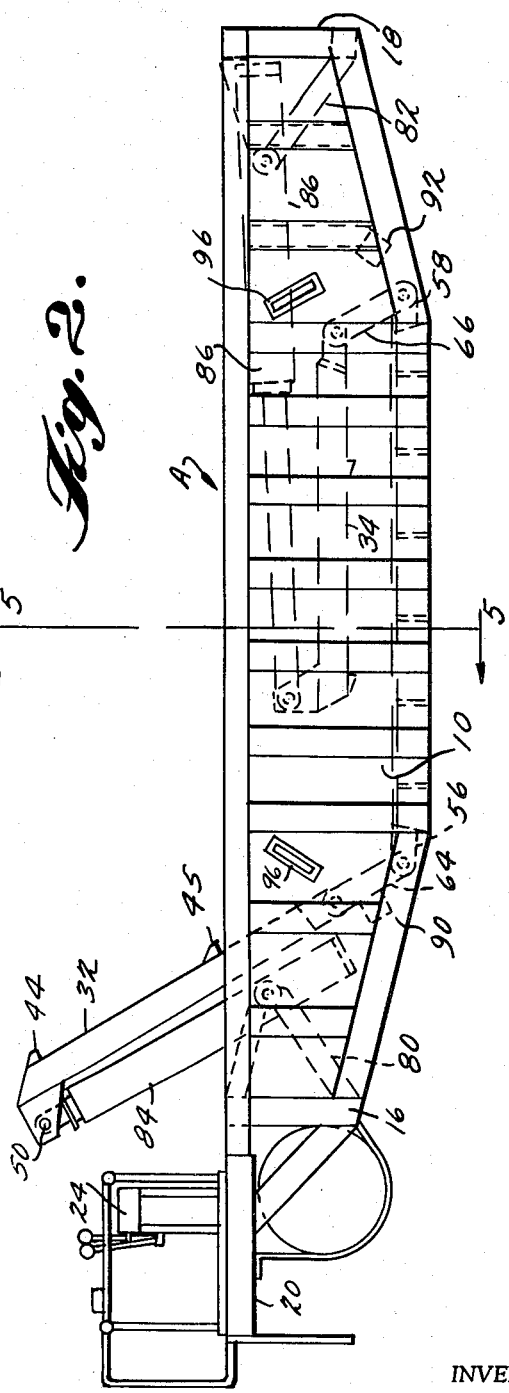
INVENTORS
ALBERT G. SWINT
MARK R. TYSON
BY Cushman, Darby & Cushman
ATTORNEYS Dec. 5, 1967  A. G. SWINT ET AL  3,356,018
PRESS FOR COMPACTING BULKY MASSES
Filed Oct. 23, 1965  3 Sheets-Sheet 2

INVENTORS
ALBERT G. SWINT
MARK R. TYSON
BY Cushman, Darby & Cushman
ATTORNEYS

Dec. 5, 1967  A. G. SWINT ET AL  3,356,018
PRESS FOR COMPACTING BULKY MASSES
Filed Oct. 23, 1965  3 Sheets-Sheet 3

INVENTORS
ALBERT G. SWINT
MARK R. TYSON
BY Cushman, Darby & Cushman
ATTORNEYS

United States Patent Office 3,356,018
Patented Dec. 5, 1967

3,356,018
PRESS FOR COMPACTING BULKY MASSES
Albert George Swint, West St. Paul, Minn., and Mark R. Tyson, Cordele, Ga., assignors to Harris Press and Shear Corp., Cordele, Ga., a corporation of Minnesota
Filed Oct. 23, 1965, Ser. No. 503,883
10 Claims. (Cl. 100—208)

ABSTRACT OF THE DISCLOSURE

The invention herein relates to a compact and transportable baling press for particular use in compressing irregular scrap shapes, such as junked automobiles, at a scrap site, for subsequent economical transportation to scrap finishing centers. By the cooperation of the frame, comprising bottom, side and end walls, and a pair of hydraulic ram actuated lid covers secured to opposite side of the frame by a double-pivoted linkage arrangement, a single operator may, by the rapid alternate or combined manipulation of the lids, condense a scrap automobile body into a flattened, box-like shape for convenient stacking and transportation. In the final compacting operation of the press, the pivoted linkage system permits the lids to adjust themselves to be lowered one above the other so that the upper lid assists the lower lid in applying final compacting forces to the scrap mass.

---

This invention relates to a press for crushing bulky masses of material, and more particularly to novel apparatus for crushing and compacting scrap automobile bodies.

It is commonly known that many of the millions of automobiles that are manufactured annually in the United States are abandoned or sold for junk, either as a result of accidents of serious mechanical defects, within a few years after production. After such automobiles have been stripped of whatever salvageable parts that remain, such as tires, battery, engine, and the like, they usually are added to the unsightly and constantly swelling mounds of rusty automobile shells which dot the countryside. The increasing production rate of automobiles in recent years indicates strongly that more and more automobiles will find their way to these junk heaps, thereby acutely increasing the problems of disposal, and of beautifying the rural or urban areas where such dumping grounds are located.

Previous efforts have been made to eliminate or reduce such junkyards by salvaging the recoverable scrap metal, particularly the ferrous metals, from the automobile bodies. Several of the methods employed involve the cutting of the body by manual means into several sections with subsequent individual compacting of the sections. These methods have generally proven to be too time consuming and cumbersome to be practical and economical. In recent years, baling presses and metal shears with the capacity to crush, compact and cut an entire automobile body into small, dense, transportable slabs have gone into use. In these presses and shears, and in other types of related apparatus such as shredders, the scrap metal is processed so that it may be economically transported to an iron and steel mill for melting and recovery of the ferrous metal.

However, these machines are usually quite expensive, require large amounts of power, are very heavy and, with some exceptions, are relatively immobile. In order to operate economically, these machines should constantly be fed large amounts of scrap, but the scrap content of an automobile graveyard of average size can be processed by a single unit in a relatively short time, ranging from days to weeks. After that an on-site press and shear unit would, of necessity, have to be laboriously dismanteled or otherwise prepared for a slow journey, usually by rail, to another scrap location.

Consequently, these large shears are usually located at a central point and the scrap autos are transported thereto, by rail or truck, so that a constant supply of scrap material is available for processing. This procedure, however, does not solve the problem, but merely changes its form. The automobile bodies occupy considerable space and, in their original shapes, are expensive to transport, and this expense increases the cost of the processed scrap.

Accordingly, it is an object of the present invention to provide a press mechanism for crushing and compacting large bulky masses, and particularly old automobile bodies.

Another object of the invention is to crush and compact bulky scrap masses so that such scrap may be economically transported to the site of a centrally located facility for further processing.

Another object of the present invention is to provide a press mechanism that can crush an entire automobile body without prior manual sectioning, but which may be easily and quickly moved, together with its power sources, from one scrap site to another.

A further object of the present invention is to provide a press mechanism that will crush and compact a bulky scrap mass, and particularly an automobile body, into a flattened mass of relatively uniform length, width and thickness for ease and convenience in stacking and transporting the compacted mass to a central facility for further processing.

A still further object of this invention is to provide a press mechanism having a pair of movable pressing members wherein the force of one pressing member may be applied to aid the advance of the other member against the resistance of the charge being compacted.

Still another object of this invention is to provide a press mechanism wherein the movable press members will adjust themselves during the crushing operation according to the size, shape and resistance of the mass being compacted so that the completed charge may be compacted, without appreciable "balling" effects, to a relatively flat mass of desired dimensions.

Still other further objects and advantages of the present invention will become apparent to those skilled in the art from the following detailed description and appended claims, and accompanying drawings, wherein:

FIGURE 1 is a plan view of an automobile crushing mechanism embodying the principles of the present invention;

FIGURE 2 is a side elevational view of the apparatus illustrated in FIGURE 1;

FIGURE 4 is a side elevational view similar to

Figure 3:
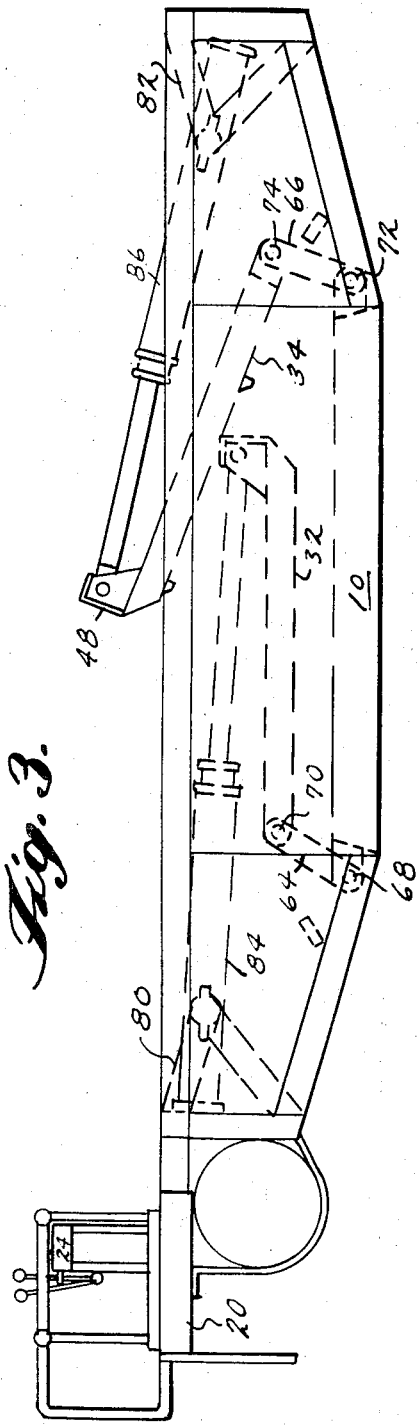
FIGURE 3 is a side elevational view similar to FIGURE 2, but showing the movable pressing members in overlapping relationship.
Figure 5:
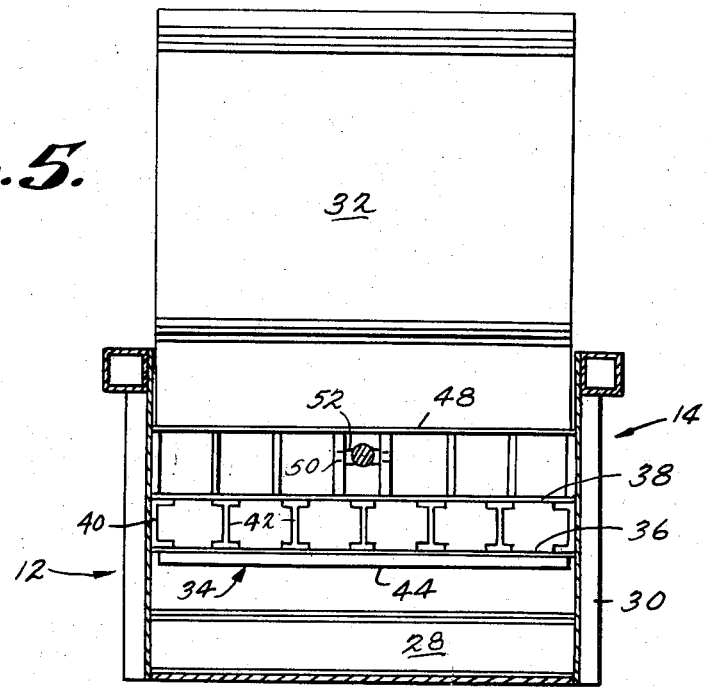
Figure 7:
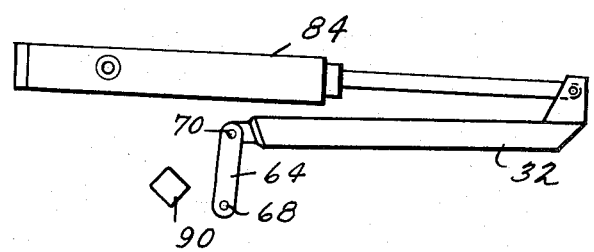
Figure 6:
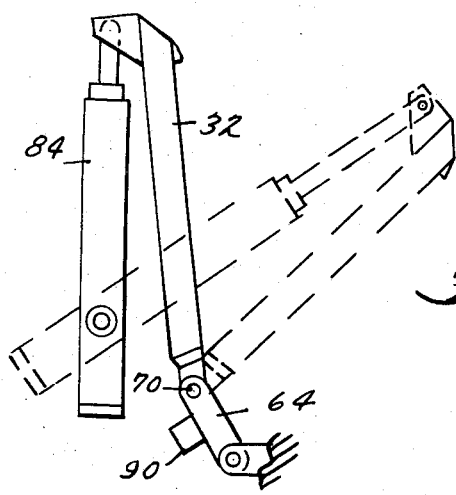

FIGURES 2 and 3, but showing the movable press members disposed in retracted positions;

FIGURE 5 is a vertical cross sectional view taken along line 5—5 in FIGURE 2;

FIGURE 6 is a fragmentary elevational view showing the relative movements of a press member and associated hydraulic mechanism;

FIGURE 7 is a fragmentary side elevational view showing further movements of a press member and associated hydraulic mechanism.

Referring now more particularly to the drawings, FIGURE 1 and FIGURE 2 show a top view and a side view, respectively, of a crushing mechanism embodying the present invention. Specifically, the machine includes a main frame, generally designated at A, all of the other elements of the mechanism being mounted on or within this frame. The frame has a central base or bottom portion 10, and side walls 12 and 14 which extend beyond the ends of the base. The side walls are joined at their opposed ends by end members 16 and 18.

In addition, a platform extension 20 is supported adjacent to one end of the frame and substantially parallel to the top of the frame. All of the operator's equipment, including a suitable motor 22, control valves 24, hydraulic pump 26, and accessory equipment, are mounted for convenience on this platform. The operator normally stands upon this platform to operate the equipment and perform all of the operations hereinafter described.

By virtue of nature and purpose of the apparatus, it will be seen that a very sturdy frame A is contemplated because of the magnitude of the forces involved in flattening a metallic car body. Therefore, it should be understood that the base or bottom 10 of the frame is heavily reinforced and underlaid with channels or beams 28. Similarly, it should also be understood that the sidewalls 12 and 14 are to be strongly reinforced by spaced vertical reinforcing members 30. The end members 16 and 18, which primarily serve to resist forces tending to move the side walls apart, and to support the hydraulic rams, hereinafter described, must also be suitably reinforced.

As will be seen from the preceding description, the frame A thus far defines the bottom and the vertical sides of a receptacle space or chamber wherein the automobile body or other bulky mass to be compacted will be placed. The crushing force on the mass is applied through a pair of press lids, 32 and 34, respectively. Each of these lids is essentially rectangular in shape, and of a width approximately equal to the interior dimension between the vertical walls 12 and 14. The length of the lids may vary within limits, but, for the purposes described hereinafter, must be greater than one-half of the length of the base 10. As shown more fully in FIGURE 5, the lid 34 comprises a pair of heavy sheet members 36 and 38. These are spaced by and reinforced by channel members 40 at each side of the sheets, and by intermediate I-beams 42. The structural members 40 and 42 serve to reinforce the lid 34 primarily in the longitudinal direction. Lateral support for the lid is provided by bars 44 and 45 which traverse the underside sheet 36 from side to side. Above the member 38, additional lateral reinforcement and stiffening is provided by the bracing structure 48 secured to the topside of the sheet 38. This structure also includes a mounting 50 for a shaft 52. The lid 32 is also built according to the specifications for lid 34, and therefore the above description of the construction of lid 34 may be considered to apply to lid 32.

On the interior of the frame A, the top of the base 10 is elevated to some extent by the reinforcement members 28 previously mentioned. At each end of this reinforced base are spaced brackets 56 and 58 which extend outwardly away from the base generally toward the end members 16 and 18 respectively. Each of the bracket 56 and 58 at each end of the base is provided with an aperture adapted to receive a common shaft, perpendicular to the side walls of the frame. Similar spaced brackets 60 and 62 are provided at one end of the lids 32 and 34, respectively. A plurality of elongated links 64 with apertures at each end thereof are adapted to interfit with the brackets 56 and 60, and similar links 66 are adapted to interfit with brackets 58 and 62, as shown in FIGURES 1 and 2. In this interfitting relation, the links 64 are joined to brackets 56 and 60 by shafts 68 and 70, respectively. Shafts 72 and 74 join the links 66 to the brackets 58 and 62, respectively, in like fashion. Thus, the links at each end of the base are pivoted for rotation about the shaft 68 or 72 in an arc parallel to the side walls 12 and 14, and, in addition, the lids 32 and 34 may also pivot, in limited arcs, about the shafts 70 and 74, respectively.

Secured to the ends of the frame A are structural units 80 and 82 which pivotally mount a hydraulically actuated ram 84, 86, respectively, at each end of the frame. The end of the piston rod of ram 84 is mounted for free rotation about the shaft 52 on lid 32 and the end of the rod of ram 86 is likewise mounted for rotation about the shaft 52 on lid 34. Although the shafts 52 could be mounted at some point rearwardly of the forward edge of each lid, preferably they are positioned as shown in FIGURES 1–4 in order that maximum leverage may be obtained from the ram and lid combination. Bar members 90 and 92 extend transversely across the frame parallel to the shafts 68 and 72, and rearwardly of the links 64 and 66, respectively. These members 90 and 92 serve as stops for the adjacent links and thereby limit the arcuate path through which the links may pivot in the direction away from the base 10. Thus, each lid 32 and 34 may, upon proper actuation of the associated ram, be advanced from the open position illustrated by lid 32 in FIGURE 4 to the closed position of the same lid in FIGURE 3, and then be retracted back again.

Figure 4:
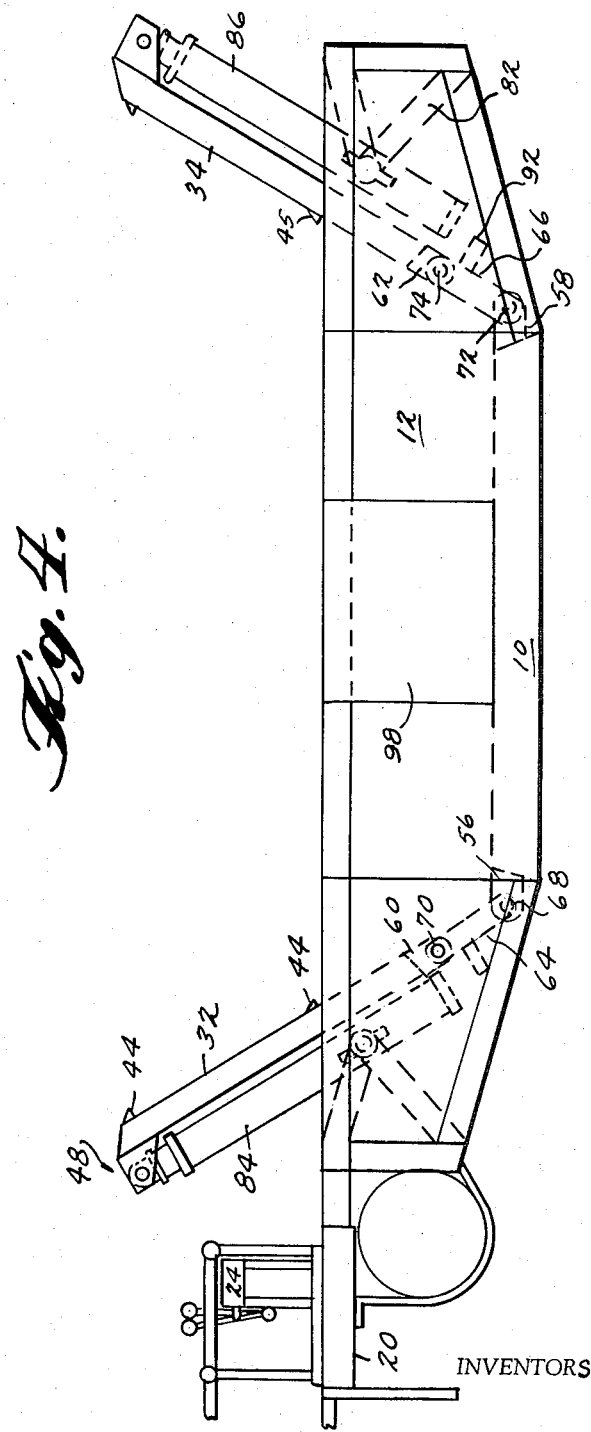

From the preceding description it will be seen that, when the respective parts are assembled as described, the lid 32, when the ram 84 is fully retracted, assumes the position shown in FIGURES 2 and 4 and the lid 34, when the ram 86 is fully retracted, assumes the position as shown in FIGURE 4. Preferably, both lids should be in this fully retracted position when a vehicle body, for example, is to be placed within the frame A for compacting. A crane or similar means may be utilized to move the automobile body to a position over the frame, and to lower this body, as far as possible, into the interior of the frame. Assuming, for the moment, that the automobile body is of dimensions smaller than the base, the body may immediately pass conveniently into engagement with the bottom of the frame. Thereupon, the operator, standing on platform 20, can manipulate the hydraulic controls 22, to advance both lids 32 and 34 to a position wherein each lid is inclined at an angle toward the other. At that point, the advance of the lid 32 is halted and the advance of the lid 34 is maintained until the resistance of the automobile body, or other charge, within the chamber becomes great enough to cause the ram mechanism 86 driving lid 34 to stall. Thereupon, the operator retracts lid 34 toward the open position until sufficient clearance is gained for lid 32 to advance from its previous position to a "stall" position. At this point, lid 32 will be substantially overlaying base 10 and the charge at an angle from the horizontal of substantially less than 45 degrees. The lid 34 is then advanced from its previous position so that it descends on top of lid 32 and makes contact with the reinforcing structure 48 on top of lid 32, as shown in FIGURE 3. It will be seen that the further advance of lid 34 causes the force applied by its associated ram 86 to be transmitted to lid 32, thereby greatly increasing the crushing effect of the latter lid upon the charge. According to the preferred method, the lid 34 continues to apply its force upon lid 32 until it, lid 34, also stalls. Then both lids are retracted sequentially, so that lid 34 alone may be advanced against the charge to a stall position. When stall of lid 34 occurs, lid 32 is thereupon advanced to contact and overlie lid 34, similar to FIGURE 3, but with the lid positions reversed.

After lid 32 has been fully advanced to stall, the charge should, in the normal case, be compacted to the desired degree. However, in the case of a charge having more than normal resistance, it may be desired to retract both lids, close lid 32 to stall, and then close lid 34 on lid 32, repeating the steps described hereinabove.

If the length of the automobile body or other charge to be compacted exceeds the length of the base 10 of the compacting chamber, an additional procedure may be followed to shorten the body for easier accommodation. With both pressing lids 32 and 34 in the retracted or open position, as shown in FIGURE 4, the automobile body may be lowered as far as possible toward the base 10. When the automobile has reached the lowermost position, resting on the underside of the lids 32 and 34, one or both of the lids may be simply advanced to the vertical position or beyond, toward mutual engagement. The force asserted by the lids on the body will shorten it to a length whereby it will easily fall, when the lids are retracted again, to the bottom of the chamber. Then the procedure for final compacting, described above, may be followed to completion.

In addition to merely crushing or compacting scrap such as old automobiles, it is a feature of the present invention that the volume and shape of the charge space or chamber may be automatically self-adjusted to allow for varying sizes and resistances of the charges to be compacted so that each charge can be uniformly flattened into a generally rectangular configuration for convenient stacking and transportation. For example, if automobile bodies were compressed so that they were thin at each end but high in the middle portion, or were compressed so that they were thin at one end with gradually increasing thickness (i.e., height) toward the other end, such compressed bodies would be difficult to stack and would occupy entirely too much space in shipment. For similar reasons, a charge that becomes "balled-up," or substantially shortened longitudinally with a corresponding increase in height, is also undesirable. In addition, if the body shell becomes intertwined with the frame members as they are twisted or distorted, further processing of the scrap is made more difficult and expensive. In contrast, compressed charges that are substantially uniform in length, width and thickness may be easily handled and stacked, one upon the other or side by side, into a space of minimum volume for economical shipment to a central facility for further processing. In the present invention these desirable characteristics are achieved with a minimum of balling, or twisting of the frame members.

Generally, the self-adjustment feature is effected by means of the rigid links 64 and 66 which are pivotally connected at one end thereof to the brackets 68 and 72, and at their other ends to the brackets 60 and 62 at the ends of the lids 32 and 34. Referring now more particularly to FIGURE 6 of the drawings, it will be seen that a lid, 32 for example, when being advanced by ram 84 from the open position shown in FIGURE 4, may initially pivot in an arcuate path about the shaft 70 during its advance while the links 64 remain in substantial abutment against the stop 90. After the lid 32 has pivoted through a substantial arc, as shown by the dotted lines in FIGURE 6, the closely spaced links 64 may pivot in unison about the shaft 68 so that the entire lid 32 is translated longitudinally with respect to the base, thereby reducing the maximum longitudinal dimension of the charge space, as will be evident from FIGURE 7. In addition, it will be observed that when the links 64 pivot, the vertical elevation of the shaft 70, and therefore the elevation of the connected end of the lid 32, with respect to the base 10, varies according to the angle at which the links are disposed.

Alternatively, the lid 32 may initially swing with links 64 in an arcuate path about the shaft 68, particularly if there is little or no charge resistance against the movement of the links. This arcuate movement of the lid and links is maintained by the tensile reaction to the extended force of ram 84 until the lid reaches some position where further movement of the links is substantially opposed by the resistance of the charge. At that point, further extension of the piston of the ram 84 will cause the lid 32 to pivot forwardly about the shaft 70 toward the middle of the chamber in an arcuate path against the charge within the frame A.

In either of the alternative examples, the exact point where the lid and links start or cease to move will depend on a number of variables, including the relative dimensions and distatnce between the link pivots and the line of application of the forces applied on lid 32 by the ram 84, and the size and resistance of the particular charge being compacted. For purposes of the invention however, the initial path that the lid and links take is of relatively small consequence. The object of this feature is that during the compacting operation, described hereinabove, each lid and its links may alter their positions when compacting the charge so the ram forces are applied to the charge through a multiplicity of application points, thereby effecting more complete and uniform compacting. In addition, the effective interior dimensions of the charge space are varied according to the position of the links when the respective lids are advanced against the charge. This positioning of the links, is, in turn, a function of the resistance which is encountered by the lid during its advance against the charge. For example, if little or no resistance is encountered by the lid, it will advance into the charge space substantially as shown in sequence by FIGURES 6 and 7. That is, the lid will first pivot about shaft 70 until the lid makes contact with the charge or becomes substantially horizontal. At that point, further extension of the hydraulic ram will cause the links 64 to pivot forwardly about the shaft 68 until the lid 32 assumes a position substantially as shown in FIGURE 3. When the lid, or rather, both lids, reach this position, the volume of the charge space will be minimized.

On the other hand, if a large, bulky charge is inserted into the chamber, then the increased resistance of the charge causes the rams to stall before the links 64 and 66 swing forwardly past the shsafts 68 and 72, respectively. It will be observed that when the links are in these positions both the height and length of the charge space will be increased so that the volume thereof will be considerably greater than in the preceeding example.

It will be appreciated by those skilled in the art that the links 64 and lid 32 will, for charges having intermediate sizes and ranges of resistance, position themselves as the lids advance to stall so that maximum leverage and force is applied at all times to the charge material being compacted. For any given resistance, the final stall position of the lids will also tend to minimize the dimensions of the charge space. It will also be appreciated that due to the flexibility of the lid and link arrangements that in the final compacting stages the lid in direct contact with the charge may always be able to achieve a substantially horizontal position while applying force against the charge. This is true, whether the links be pivoted forward into the charge space or whether they be abutted against the stop 90. Accordingly, after each lid has been finally driven to stall against the charge, the charge should have been compressed to the desired, generally rectangular, configuration.

Although the links 64 have been illustrated and described herein as individual connecting members, it should be understood that each set may be formed from a substantially solid block having recesses at the ends thereof to accommodate the brackets 56 and 58. It should also be understood that the lid 34 and links 66 are arranged and function similarly to lid 32 and links 64 as described hereinabove. Wherever an automobile body has been referred to as a charge material hereinabove, it has only been by way of example, and the press described herein may be utilized with other types of charges and scrap materials as well.

Although a press mechanism as described hereinabove may be mounted on wheels for portability, the particular embodiment illustrated in the drawings and described hereinabove is simply provided with a pair of openings or eyelets 96 in the sides 12 and 14 of the frame A. These openings are reinforced and may be used to receive hooks, grapples, or the like, from a crane, and the entire frame may be easily hoisted and placed on a railroad car or flatbed truck for transportation to any convenient point. In addition, in order that the compressed charge may be conveniently removed from the press by means of a fork-lift truck, part of the side wall 12 may be removed entirely or replaced by a swinging door 98, as shown in FIGURE 4, so that the forks of the truck may be moved in under the charge and then raised so that the charge will clear the top of the frame.

While the particular press mechanisms shown herein and described in detail are fully capable of attaining the objects and providing the advantages hereinabove stated, it is to be understood that they are merely illustrative of the presently preferred embodiments of the invention, and that no limitations are intended to be placed upon the details of construction other than as defined in the appended claims.

What is claimed is:

1. A press for flattening bulky masses comprising a frame defining a chamber for receiving a mass to be compacted, a pair of press lids pivotally connected to said frame at opposite ends of the frame for arcuate movement from an open position to a closed position overlaying a portion of said chamber, ram means associated with each press lid for individually advancing each lid from an open position to a stall position and for retracting said lid from a stall position to an open position, one of said press lids being adapted to overlap the second of said lids when both lids are sequentially advanced to the stall position so that the force of first-said lid is applied to assist the advance of the second press lid.

2. A press for flattening bulky masses comprising a frame defining a chamber for receiving a mass to be flattened, a pair of press lids pivotally connected to said frame at opposite ends of the frame for arcuate movement from an open position to a closed position overlaying a portion of said chamber, ram means associated with each press lid for individually advancing each lid from an open position to a stall position and for retracting said lid from a stall position to an open position, each of said press lids being adapted to vertically overlap one another when they are sequentially advanced to the stall position so that the force of the last-advanced lid is applied to assist the advance of the first-advanced lid.

3. A press for flattening and compacting bulky masses, comprising a frame defining the bottom and two opposing vertical sides of a chamber for receiving a mass to be flattened, a first press lid pivotally connected to said frame along a line perpendicular to the side walls of said chamber, a second press lid pivotally connected to said frame along a second line perpendicular to the side walls of said chamber, a pair of hydraulic ram means mounted on said frame and adapted to individually advance each press lid through an arcuate path from a substantially vertical position to a substantially horizontal position overlying a portion of said chamber and to individually retract each press lid from said substantially horizontal position to the substantially vertical position, said second press lid being adapted to overlap said first press lid when both of said lids are sequentially advanced toward a horizontal position so that the compacting force of the second press lid is transmitted to the first press lid to increase the force applied on a mass within said chamber.

4. A press for compacting a bulky mass, comprising a frame defining the base and two opposed side walls of a chamber for receiving the charge to be compacted, a plurality of rigid links pivotally connected at one end thereof to one end of said base between said side walls along a line intersecting said side walls, a press lid pivotally connected to the opposite end of said links and adapted for swinging movement from an open position to a closed position substantially overlaying said base, ram means pivotally mounted on said frame and adapted to advance the lid from the open position to the closed position and to retract the lid from the closed position to the open position, said links being responsive to the resistance of the charge being compacted so as to cooperate with the press lid to vary the line of application of force against the charge.

5. Apparatus as defined in claim 4 wherein said links define the end walls of said chamber while the charge is undergoing compacting and said links pivot as a unit about their connection with the base during the advance of the associated lid, thereby varying the height and length of said chamber.

6. A press for flattening and compacting a bulky mass, comprising a frame defining the base and two opposing side walls of a chamber for receiving a mass to be compacted, a plurality of links pivotally connected at each of the ends of said base along a line intersecting said side walls, a press lid pivotally connected to said links at each end of said base and adapted for arcuate movement between said side walls from an open, substantially vertical position to a closed position at least partially overlaying said base, ram means associated with each press lid and adapted to individually advance said lid from said open position to said closed position and to retract said lid from the closed position to the open position, said links being responsive to the force applied on said press lid and the resistance of the bulky mass being compacted so as to vary the line of force application against the mass thereby increasing the compacting effect of the advancing press lid.

7. A press for compacting a bulky mass, comprising a frame defining the base and two opposed side walls of a chamber for receiving the charge to be compacted, linking means pivotally connected to each end of said base for swinging movement about a line intersecting said side walls, a press lid pivotally connected to each of said linking means at each end of said base and adapted for arcuate movement from an open position to a substantially closed position overlaying a portion of said base, ram means mounted on said frame end adapted to sequentially advance each lid from said open position to said closed position and to sequentially retract each lid from the closed position to the open position, each of said press lids being adapted to partially vertically overlap one another when both lids are sequentially advanced to the closed position so that the force applied on the upper of the lids is transmitted to the lower of the lids, said linking means connected to each lid being responsive to the compacting forces on the associated lid and the resistance of the charge so as to concentrate the compacting forces at the point of greatest resistance of the charge.

8. Apparatus as refined in claim 7 wherein said ram means comprise a pair of hydraulic rams, each of said rams being pivotally mounted on said frame and having its piston rod connected to the upper side of a single press lid.

9. Apparatus as defined in claim 7 wherein said linking means comprise a plurality of elongated rigid links each link having one of its ends connected to the base and the opposite end of said press lid.

10. A press mechanism for compacting bulky masses such as automobile bodies, comprising a reinforced frame, said frame having a base and two opposed vertical side walls extending beyond both ends of said base, a plurality of elongated rigid links connected to said base at each end of said base along about a shaft having its axis substantially perpendicular to said side walls, a pair of substantially rectangular press lids adapted for movement between said side walls, said links at one end of said base being pivotally connected to one end of one of said lids and the links at the other end of said base being pivotally connected to one end of the other of said lids, a hydraulic ram mounted at each end of said frame beyond the ends of the base, each of said hydraulic rams having its piston rod connected adjacent to the unconnected end of the nearest of said lids and being adapted to advance that lid through an arcuate path from an open, substantially vertical position to a closed, substantially horizontal position overlaying said base and to retract that lid through an arcuate path from said closed position to said open position, one of said press lids being adapted to partially vertically overlap the other of said lids when both lids are disposed in said closed position, said links at each end of said base being adapted to permit movement of the entire associated lid both arcuately and longitudinally with respect to said base in response to driving forces of said associated ram and resistance forces of a charge within said frame.

References Cited

UNITED STATES PATENTS

| | | | |
|---|---|---|---|
| 2,816,502 | 12/1957 | Eismann | 100—233 X |
| 2,932,244 | 4/1960 | Moyer | 100—233 X |
| 2,932,247 | 4/1960 | Thompson | 100—232 |
| 3,101,045 | 8/1963 | Jan Endert | 100—233 |
| 3,124,062 | 3/1964 | Thompson | 100—215 |
| 3,237,554 | 3/1966 | Davis | 100—218 |

FOREIGN PATENTS

| | | |
|---|---|---|
| 1,074,103 | 3/1954 | France. |
| 1,380,574 | 10/1964 | France. |
| 890,864 | 3/1962 | Great Britain. |

BILLY J. WILHITE, *Primary Examiner.*